Oct. 30, 1956 A. D. HOFFMANN ET AL 2,769,025

PREPAID ENTERTAINMENT DISTRIBUTION SYSTEM

Filed May 4, 1951 5 Sheets-Sheet 1

ROBERT E. GOTTFRIED
ALLEN D. HOFFMANN
INVENTORS
BY Lyon & Lyon
ATTORNEYS

Oct. 30, 1956 A. D. HOFFMANN ET AL 2,769,025

PREPAID ENTERTAINMENT DISTRIBUTION SYSTEM

Filed May 4, 1951 5 Sheets-Sheet 2

ROBERT E. GOTTFRIED
ALLEN D. HOFFMANN
INVENTORS

BY Lyon & Lyon

ATTORNEYS

Oct. 30, 1956 A. D. HOFFMANN ET AL 2,769,025

PREPAID ENTERTAINMENT DISTRIBUTION SYSTEM

Filed May 4, 1951 5 Sheets-Sheet 3

ROBERT E. GOTTFRIED
ALLEN B. HOFFMANN
INVENTORS

BY Lyon & Lyon
ATTORNEYS

Oct. 30, 1956 A. D. HOFFMANN ET AL 2,769,025

PREPAID ENTERTAINMENT DISTRIBUTION SYSTEM

Filed May 4, 1951 5 Sheets-Sheet 4

ROBERT E. GOTTFRIED
ALLEN D HOFFMANN
INVENTORS

BY Lyon & Lyon
ATTORNEYS.

Oct. 30, 1956 A. D. HOFFMANN ET AL 2,769,025

PREPAID ENTERTAINMENT DISTRIBUTION SYSTEM

Filed May 4, 1951 5 Sheets-Sheet 5

ROBERT E. GOTTFRIED
ALLEN D. HOFFMANN
INVENTORS

BY Lyon & Lyon

ATTORNEYS

United States Patent Office 2,769,025
Patented Oct. 30, 1956

2,769,025

PREPAID ENTERTAINMENT DISTRIBUTION SYSTEM

Allen D. Hoffmann and Robert E. Gottfried, Los Angeles, Calif., assignors, by mesne assignments, to International Telemeter Corporation, a corporation of Delaware Application May 4, 1951, Serial No. 224,622

14 Claims. (Cl. 178—5.1)

This invention relates to a secrecy preserving system for use with apparatus for transmitting intelligence from one place to another by electromagnetic radiations, and has particular reference to apparatus for use with television transmitters and receivers for producing coded or scrambled video signals, and for decoding or unscrambling such signals at a receiving station.

The recent growth of the television industry and recent experience in television broadcasting indicates that the broadcasting of television entertainment cannot be carried forward on a profitable basis if reliance is placed solely on advertising revenues for defraying the costs of producing and transmitting such entertainment. These factors demonstrate the need for a television transmitting and receiving system which allows each televiewer to be charged for the particular program received on the individual television receivers. Charging for entertainment in this fashion is analogous to the purchase of tickets at the box office of a theater or like place of entertainment, and this analogy has led to recent adoption of the term "box-office television" to describe television systems of this character.

A number of box office television systems have been suggested. For example, the Ellett Patent No. 2,510,046 discloses a subscription type of television system wherein scrambled or coded entertainment material is broadcast in such form as to be unintelligible when received on an ordinary television receiver. Authorizing receiving stations are fitted with an unscrambling or decoding apparatus which is capable of rendering intelligible the otherwise unintelligible transmissions. This decoding or unscrambling apparatus is controlled by key signals transmitted to the individual receiving stations over the commercial telephone systems, and a charge for supplying the key or control signal is made, the key signal being supplied by a telephone operator only upon request therefor by the subscriber, and the charge being made as an incident to supplying such a key signal upon request.

One of the outstanding disadvantages of a box office television system of the character disclosed in the Ellett patent just mentioned resides in the necessity for using land lines extending in a network telephone type system from the television transmitting station to each of the television receiving stations, and the necessity for using special switchboard equipment and operating personnel to staff such equipment and make the necessary charges for supplying the key signal.

Another type of box office television system utilizes a physical key or card which takes the place of the land line used in the Ellett system. In the physical key or card type system considerable difficulty would normally be encountered in effecting the distribution of the physical keys or cards to the many potential subscribers of the system.

The disadvantages of the box office television systems just mentioned are largely obviated in a box office television system forming the subject matter of a copending application filed on January 19, 1950, by David L. Loew et al., Serial No. 139,358, for Prepaid Entertainment Distribution System, and assigned to the same assignee as the present application. The system disclosed in said copending application utilizes a coin collection means at each receiving station and places the unscrambling apparatus under the control of the coin collecting mechanism. This obviates the necessity of employing land lines or physical keys for controlling the operation of the unscrambling apparatus. As in the system described in said copending application, the operation of the unscrambling mechanism results from the deposit of the coins in the coin collecting apparatus.

An essential feature of any box office television system is the provision of the coding or scrambling apparatus at the transmitting station and the provision of cooperating decoding or unscrambling apparatus at each of the receiving stations. Such apparatus for maintaining the secrecy of the programs until the necessary price has been paid or the corresponding charge is made must so operate as to render the transmitting signals unintelligible when received on an ordinary television receiver not equipped with the decoding or unscrambling apparatus. The scrambled signals must be of such character as to be capable of being rendered intelligible by means of relatively simple apparatus to be installed at each of the receiving stations. Furthermore, the type of secrecy afforded by the system must be substantially foolproof so as to make substantially impossible the unauthorized reception of the programs without the payment of the price charged for such entertainment. This latter requirement preferably is met by constantly varying the conditions of the coding or scrambling so as to require the unscrambling apparatus at each of the television receivers to be reponsive to a control exercised at the transmitting station.

The present invention is directed to a secrecy preserving system comprising a coding or scrambling apparatus and a decoding or unscrambling apparatus, together with certain controlling apparatus, the present invention being particularly adapted for use with a coin collection type of box office television system such as is described in the aforementioned copending application. The system of the present invention overcomes many of the disadvantages inherent in the prior systems as hereinbefore described. The present system does not require the use of land lines for controlling the decoding or unscrambling apparatus, nor does it require the use of physical keys or cards for the same purpose. The device of the present invention does not require the use of a separate channel such as the audio channel of a conventional television transmitting system for controlling the decoding apparatus as characterizes the system described in the aforementioned copending application. Instead, the system of the present invention effects the necessary control over the unscrambling apparatus by the change from time to time in character of the transmitted coded or scrambled signals.

This invention utilizes a scrambling system which is herein termed a polarity reversal system, and which is similar in principle to that disclosed in a copending application, now abandoned, Serial No. 161,997, filed May 15, 1950, by Robert E. Gottfried, for Secret Entertainment Distribution System, and assigned to the same assignee as the present application. In that system, the coding of the transmissions is effected by periodically reversing the mode of transmission of the video signals from the normal negative mode wherein black is represented by maximum signal strength, to a positive mode of transmission wherein the maximum signal strength represents white. Preferably this reversal of polarity is effected at a rate faster than the normal persistence of vision so that the positive and negative pictures alternately produced on the screen of an ordinary television transmitter merge and produce a substantially blank field. Furthermore, the transmission of negative synchronizing signals completely destroys the synchronization of the sweep generators in the normal receiving apparatus so that the resulting picture is rendered still more unintelligible by the presence of the usual dark bands, tears, and like distortions resulting from lack of synchronization.

One characteristic disadvantage of a polarity reversal scrambling system is that for a given permissible percentage modulation the maximum permissible amplitude of the modulating video signal and therefore also the amount of useful voltage which is radiated is only one-half (the power reduction being lowered to one-quarter) that obtainable if the signals, as in normal television transmission, were all of the negative mode. Obviously, a seventy-five percent reduction in useful radiated power is highly undesirable.

This invention overcomes the aforementioned disadvantage by providing an apparatus which further modifies the video signal in such a way as to allow at least eighty percent of the power which would otherwise be lost to be recovered, thus permitting the radiation of substantially the same amount of useful power with the scrambled signals as would be possible with the transmission of normal television signals.

It is accordingly an object of this invention to provide a secrecy preserving system of the character mentioned which includes means at the transmitter for periodically altering the mode of transmission so as to render the transmitted signals normally unintelligible and which includes at each of a plurality of authorized receiving stations a device for compensating for said alterations in mode of transmission so as to render the received transmission intelligible.

It is also an object of this invention to provide a system of the character set forth in the preceding paragraph which is particularly arranged for use with television transmitting and receiving apparatus.

It is another object of this invention to provide a system of the character set forth in the preceding paragraph which includes means responsive to the vertical synchronizing signals at the transmitter for controlling the time sequence of alteration of the transmitted signals.

It is a still further object of this invention to provide a secrecy preserving system of the character set forth hereinbefore which includes means at the receiving stations for detecting each alteration in the mode of transmission, together with a means coacting with said detecting means for modifying the received signal in such a way as to compensate for the alterations.

It is additionally an object of this invention to provide a system of the character set forth in the preceding paragraphs in which the mode of transmission is altered from a normal negative mode to an abnormal positive mode by reversing the polarity of the signals from time to time, and in which compensation at each of the receiving stations is effected by reversing the polarity of transmissions received according to the positive mode.

It is also an object of this invention to provide an apparatus of the character set forth in the preceding paragraph which includes means at the transmitting station for displacing the zero signal axis of each mode of transmission so as to permit substantially complete modulation of the radiated carrier signal.

It is a still further object of this invention to provide an apparatus of the character set forth hereinbefore which includes a novel timing apparatus at the transmitting station for controlling the times of change from one mode of transmission to the other.

It is an additional object of this invention to provide an apparatus of the character set forth in the preceding paragraph in which said timing apparatus is continuously adjustable so as to cause said times of change to occur at successively different times relative to the scanning of the transmitted field.

It is a further object of this invention to provide apparatus of the character set forth hereinbefore which includes novel electronic switching circuits at both the transmitting and receiving stations for maintaining synchronization of the receiving apparatus wth that at the transmitting station.

It is additionally an object of this invention to provide apparatus of the character set forth in the preceding paragraphs which includes also novel transient suppressing circuits for substantially eliminating the transients normally produced by operation of the switching circuit.

Other objects and advantages of this invention will be apparent from a reading of the folowing specification, considered in connection with the accompanying drawings, wherein.

Figure 2:
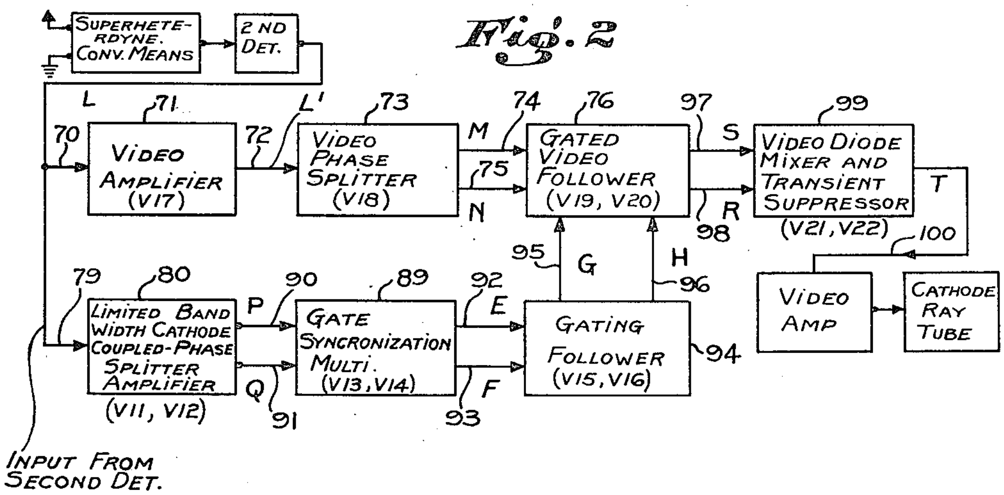
Figure 2 is a block diagram similar to Figure 1 but illustrating the apparatus used at the receiving station for decoding or unscrambling the secret transmissions.
Figure 8:
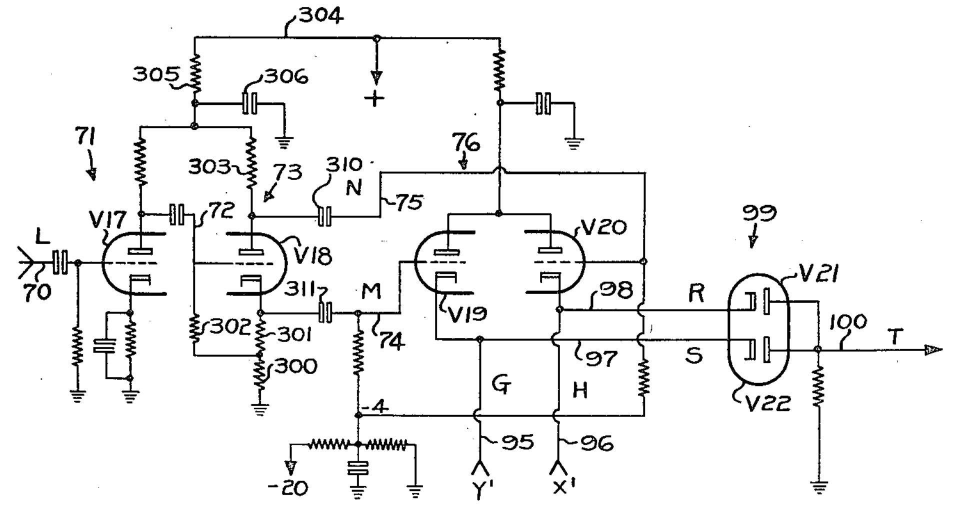
Figure 9:
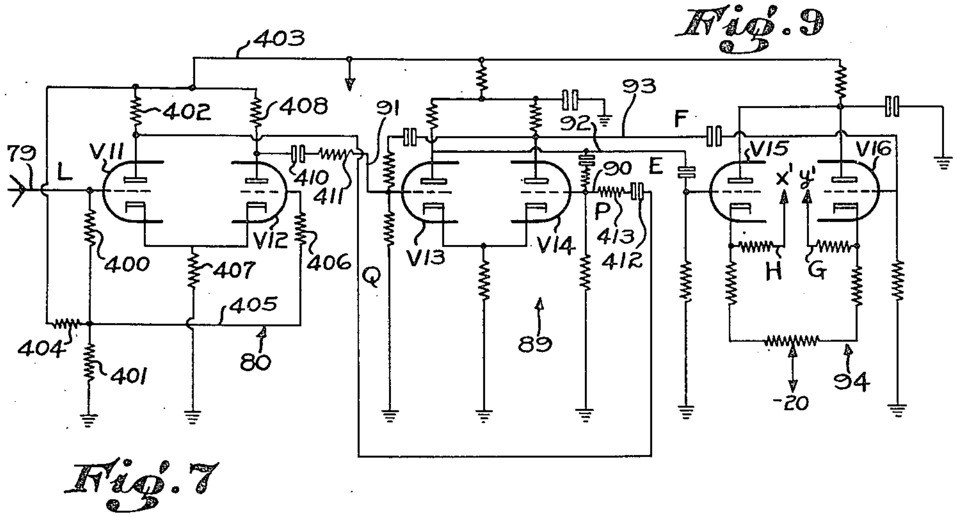

Figure 8 is a schematic wiring diagram illustrating the electrical components and the manner of their interconnection in the video phase splitter, the gated video follower, and the video mixer and transient suppressor represented diagrammatically in Figure 2; and Figure 9 is a schematic wiring diagram illustrating the details of construction of the phase splitter amplifier, the gate synchronizing multivibrator, and the gating follower illustrated diagrammatically in Figure 2.

Briefly described, the apparatus of the present invention comprises a coding or scrambling device for use at the transmitting station and a decoding or unscrambling device of such type as to be readily connected operatively in the circuit of a conventional television receiver. The scrambling device is intended to be inserted in the transmitter video channel immediately before the normal modulator unit. This device includes a video phase inverter operating to produce from the normal composite video signal a like signal differing only in that the polarity of the signal is reversed. The reversed polarity signal and the normal signal are fed through a gated video follower which operates to produce alternately on its two output terminals brief periods of normal video signal and polarity reversed video signal. These two signals are combined in a video mixer and are applied to the normal modulator unit, so that the modulated transmission consists of alternate periods of transmission according to the normal negative mode and interspersed alternate periods of transmission according to a reverse polarity positive mode of transmission.

The gated video follower is controlled by timing apparatus responsive to the normal vertical synchronizing signals, and operated to switch the gated video follower from one condition to the other, after each transmitted field of the scanned subject matter. This timing apparatus is adjustable so that the point of change-over from one mode of transmission to the other may be caused to occur at any point in the sequence of operation, and may be varied from time to time or continuously during the operation of the apparatus.

The decoding or unscrambling apparatus which is used at the receiver employs a video phase splitter operating to produce on separate output terminals a signal of the same polarity as that received by the receiving apparatus and a signal of opposite polarity. These two signals are fed into a gated video follower which operates to pass alternately one of the signals produced by the video phase splitter and alternated therewith, the other signal produced by the video phase splitter. The gated video follower is controlled by timing mechanism responsive to the change in the mode of transmission of the received signals and so controls the gated video follower as to transmit the received signal directly during periods of normal transmission and to transmit a polarity reversed version of the received signal during periods of abnormal transmission, the effect of reversing the polarity of the abnormal transmissions being to convert said abnormal transmissions to normal transmissions according to the negative mode. The two outputs from the gated video follower are combined in a suitable mixing circuit. The receiver decoding or unscrambling apparatus is arranged to be inserted into the video channel of a normal television receiver immediately following the second detector of such receiver.

The timing apparatus used with the receiver unscrambler not only detects the times of change from one mode of transmission to another but distinguishes between transmissions according to the normal mode and transmissions of reverse polarity so as to correspondingly control the gated video follower and insure that the signals applied to the image reconstituting unit or viewing device of the receiver are only signals according to the normal negative mode of transmission.

Figure 1:
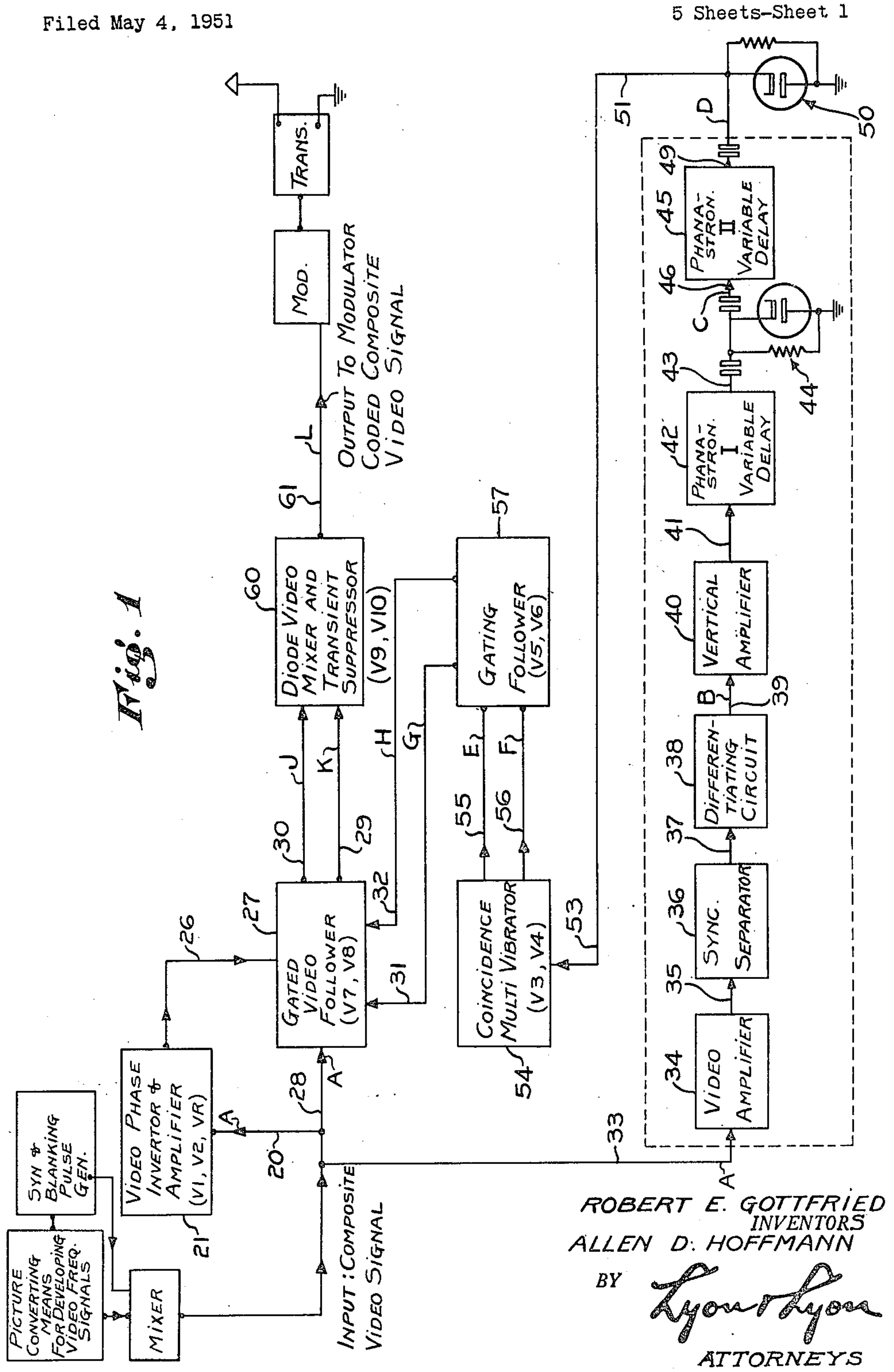
Figure 1 is a block diagram illustrating diagrammatically the interrelation of the individual components of the apparatus comprising the coding or scrambling mechanism used at the transmitting station.

In Figure 1 of the drawings, the apparatus comprising the transmitter scrambling device is illustrated diagrammatically by means of a block diagram. In this diagram, the legends inscribed within the rectangles indicate the functions of the apparatus represented thereby and the designations appearing in parentheses immediately below the legends are the vacuum tube designations used in the circuit diagrams of Figures 5, 6, 8 and 9. The solid lines interconnecting the rectangles indicate the routing of the various signals during the operation of the system, and the reference letters applied to these lines are the same as the identifying indicia of the individual graphs comprising Figures 3 and 4 and representing the wave form of the various signals. For example, in Figure 1 the reference letter A applied to the inputs to the video phase inverter and gated video follower is intended to indicate that the wave form of the signal thus applied is of the character represented by the curve A of Figure 3.

As is shown at 20 in Figure 1, a normal composite video signal is taken from the video channel of the transmitting apparatus and applied to a video phase inverter and amplifier 21. The normal composite video signal is represented by the curve A of Figure 3, and is a television signal of the conventional and well known type comprising a series of vertical blanking pedestals 22 surmounted by vertical synchronizing signals 23, such blanking pedestals and synchronizing signals being hereinafter referred to simply as vertical synchronizing signals. Between the vertical synchronizing signals 22 which occur at the field frequency of the scanning system, are interposed the requisite number of horizontal synchronizing signals indicated simply by the vertical lines 24 in curve A of Figure 3. During the times between successive horizontal synchronizing signals 24 occur the video signals proper, representing the variations in light and shade in the scanned subject. The video signal is represented in curve A by the wavering line bearing the reference character 25.

The normal composite video signal which is applied to the video phase inverter and amplifier 21 is amplified by the device 21 and subjected to a polarity reversal so as to produce an output signal which is applied as indicated at 26 in Figure 1 as one input to a gated video follower 27. A second input to the gated video follower 27 comprises the normal composite video signal which is applied to the gated video follower 27 as indicated at 28. It will be understood that the output from the video phase inverter 21 is a signal of the character represented by curve A of Figure 3 and differing therefrom only in that the changes in amplitude in the signal are in a direction opposite to that represented in curve A. That is to say, a signal which increases in the positive direction in the normal signal increases its magnitude in the negative direction in the polarity reversed signal.

As is explained in more detail hereinafter, the gated video follower 27 comprises a pair of electronic gates, one of which, when closed, applies the normal video signal from 28 to a first output line 29, and the other of which, when closed, applies the polarity reversed video signal derived from the input 26 to a second output line 30. The gated video follower is controlled by a pair of control signals applied as indicated at 31 and 32 operating to close the gates of the gated follower 27 alternately in such fashion that when one gate is closed the other is open, and vice versa. The timing of the control signals appearing at 31 and 32 is determined by the vertical synchronizing signals of the composite video signal.

This result is achieved by applying the normal composite video signal in the manner indicated at 33 to a video amplifier 34 operating to produce an amplified version of the normal video signal. This amplified version is applied as indicated at 35 to a synchronizing signal separator 36 which functions to extract from the composite video signal the vertical synchronizing signals 23 shown on curve A of Figure 3. These vertical synchronizing signals are applied as indicated at 37 to a vertical differentiating circuit 38 of conventional type operating to produce an output signal of the character represented by the curve B of Figure 3.

As will be seen from an inspection of curve B, the differentiating circuit responds to the rapid rise in potential, characteristic of the vertical synchronizing pulse, and produces as an output signal a pulse signal which rises almost instantly to a maximum amplitude and falling very quickly to a negligible magnitude. This pulse signal is applied as indicated at 39 to a vertical amplifier 40 the function of which is to further amplify the pulse signal represented by the curve B. The amplified pulse signal is applied as indicated at 41 to the trigger circuit of a phanastron timing circuit 42. The phanastron timing circuit 42 is of conventional construction, preferably as described in Zeluff & Markus Electronics Manual for Radio Engineers, first edition, published by McGraw-Hill in 1949, particular reference being had to the chapter entitled "Design of phanastron time delay circuits" by Richard N. Close and Matthew T. Lebenbaum appearing on pages 174 through 182.

The phanastron timing circuit 42 operates to produce an output pulse signal a definite time following the application of an input trigger signal to the trigger circuit of the phanastron time delay unit. The phanastron is characterized by the consistent accuracy of the delay time between the application of the trigger pulse and the production of the output pulse. This time is adjustable. For example, in the circuit shown on page 179 of the above mentioned publication, the time delay is adjusted by means of the potentiometer R7.

Figure 3:
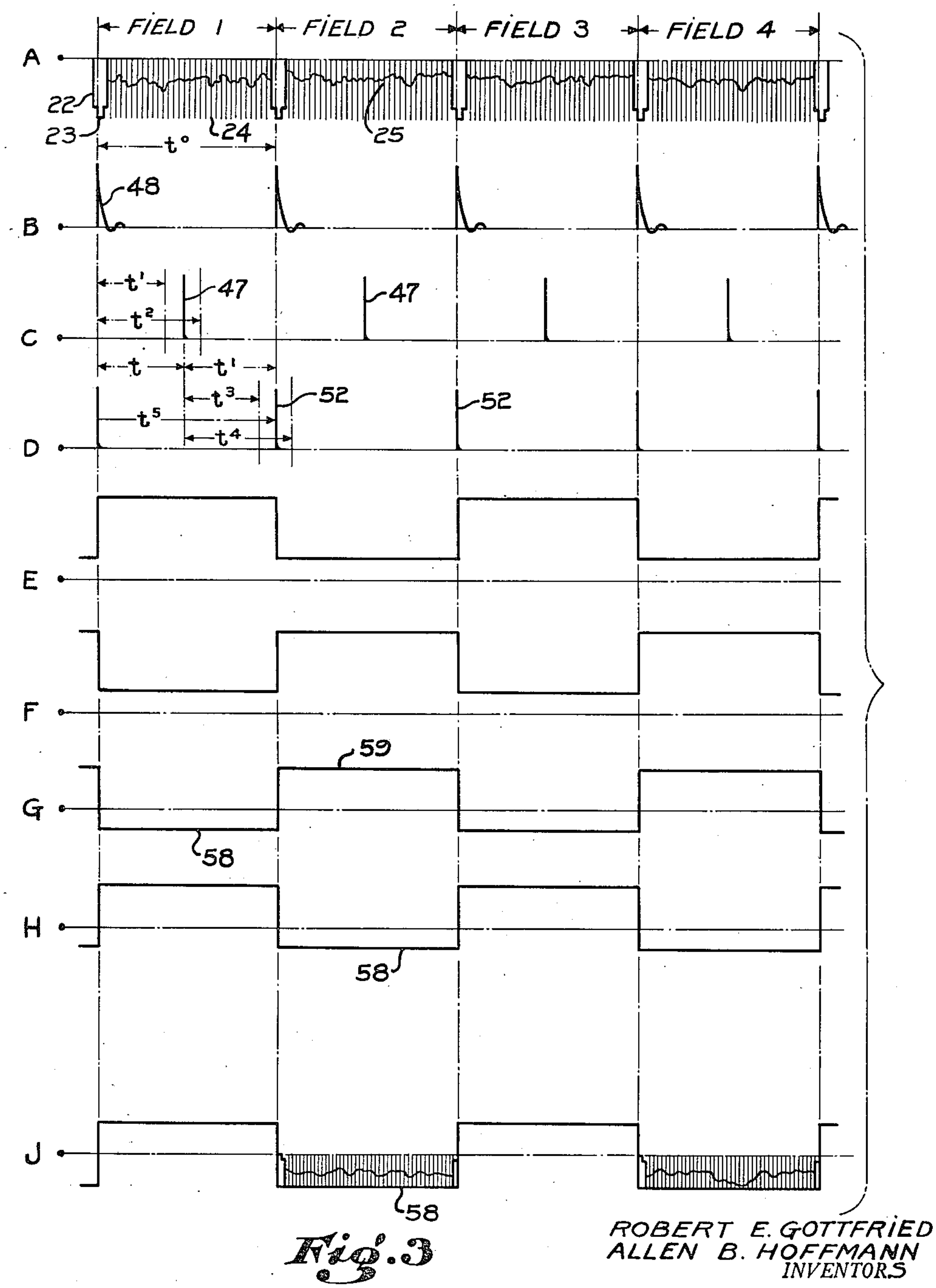
Figure 3 is a set of graphs illustrating the wave forms of the signals produced by certain of the elements of the apparatus illustrated diagrammatically in Figures 1 and 2.

The output pulse from the phanastron timer 42 is applied as indicated at 43 to a conventional clipper or clamp circuit indicated generally by the reference character 44, the function of which is to eliminate the negative going component in the output pulse signal so as to apply to the trigger circuit of a second phanastron timer 45 as indicated at 46 an input signal of the character represented by the curve C of Figure 3.

The input pulse to the second phanastron 45 is represented at 47 in curve C, and the first phanastron 42 is adjusted to cause the pulse 47 to be produced at a time $t$ after the input trigger pulse 48, as is represented on curve C by the dimension line bearing the dimension $t$. This time delay is made substantially equal to one-half of the field time from one vertical synchronizing signal to the next, the full field time being represented on curve A of Figure 3 by the dimension $t_0$. It will be understood as previously mentioned that the delay time $t$ is adjustable, for example, as between the limits represented on curve C by the dimensions $t_1$ and $t_2$.

The output of the second phanastron timer 45 is applied as indicated at 49 to a second clipper circuit indicated generally in Figure 1 by the reference character 50 and operating to eliminate from the output pulse produced by the phanastron timer 45 the negative going components of the pulse signal, so as to produce a final output on the line represented at 51 a pulse signal 52 of the character indicated by the curve D of Figure 3. These pulses occur a time $t'$ after the input pulse 47 to the second phanastron 45. The time $t'$ is also adjustable as between the limits represented by the dimensions $t_3$ and $t_4$ so that the final output pulse 52 of curve D is caused to occur at a time $t_5$ after the initial triggering pulse 48 of curve B. The time $t_5$ is the sum of the times $t$ and $t'$ and is made approximately equal to the field time $t_0$.

Since the initial triggering pulse 48 coincides in time with the vertical synchronizing signal of curve A it will be seen that if the delay time $t_5$ is made exactly to equal $t_0$ the output pulse 52 would likewise coincide with the next succeeding vertical synchronizing signal, and such a time relation is represented in Figure 3. However, as is explained in more detail hereinafter, superior results are obtained in the operation of the system if the time $t_5$ is made somewhat less or somewhat more than $t_0$, so as to position the output pulse 52 a few scanning lines before or a few scanning lines after the occurrence of the vertical synchronizing pulse.

The output pulse 52 is applied as indicated at 51 and 53 of Figure 1 to a coincidence multivibrator 54, which is described in detail hereinafter with reference to Figure 6 of the drawings. In brief, the coincidence multivibrator is a device for producing two square wave output signals which are separately applied as indicated at 55 and 56 to a gating follower 57. These two signals are represented respectively by the curves E and F of Figure 3, from an inspection of which it will be seen that the times of transition from maximum potential to minimum potential are caused to coincide exactly with the control pulses 52 (curve D of Figure 3).

The gating follower 57 (which is illustrated in detail in Figure 6 of the drawings and described in detail hereinafter) operates to produce from the two inputs 55 and 56 a pair of outputs which are applied as hereinbefore mentioned and as indicated at 31 and 32 to the gated video follower 27. These outputs are of the square wave type and are represented by the curves G and H of Figure 3. These square wave outputs are identical with the inputs 55 and 56 insofar as wave form and periodicity are concerned, but differ from the inputs in being accurately controlled as to the magnitude and polarity of the maximum and minimum amplitude portions of the square wave signal. For example, as may be seen by reference to curve G of Figure 3, the minimum amplitude portion of the output from the gating follower 57 are negative in polarity and are of relatively small magnitude, that is, of the order of 6 volts, whereas the maximum amplitude portion 59 is of positive polarity and a magnitude of the order of 15 volts.

Figure 5:
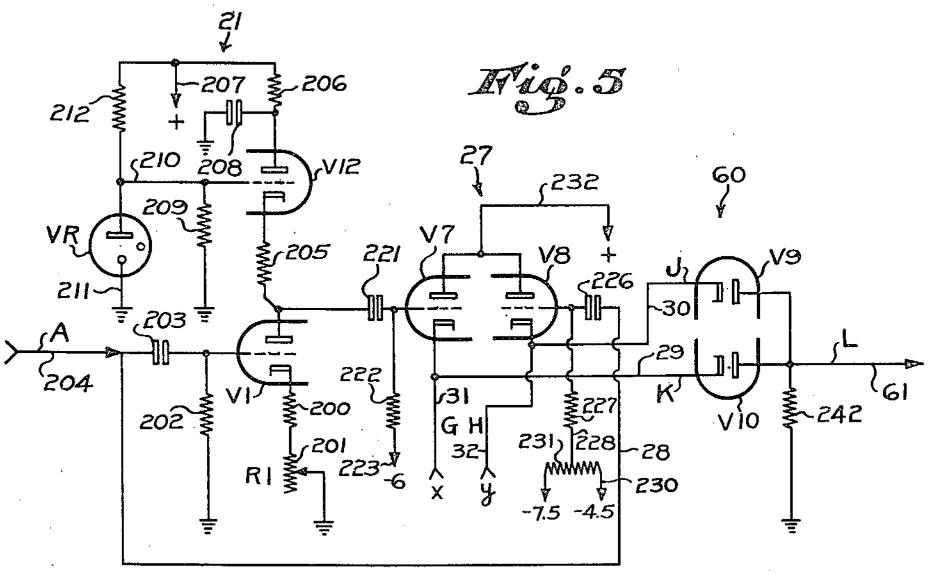
Figure 5 is a schematic wiring diagram illustrating the details of the apparatus comprising the video phase inverter, the gated video follower, and the video mixer and transient suppressor of Figure 1.

The square wave signals represented by the curves G and H of Figure 3 control the gates in the gated video follower 27, which is illustrated in Figure 5 of the drawings and described in detail hereinafter. It will be understood that the square wave signals shown at G and H in Figure 3 control the opening and closing of the individual gates, the gates in effect being closed during the minimum amplitude portions 58 of the control signals. During these periods the input signals (applied as indicated at 26 and 28) are superimposed upon the control signals (applied as indicated at 31 and 32) to provide the pair of output signals which appear on the lines 29 and 30 of Figure 1. These signals are of the type represented by the curve J of Figure 3 and curve K of Figure 4.

Figure 4:
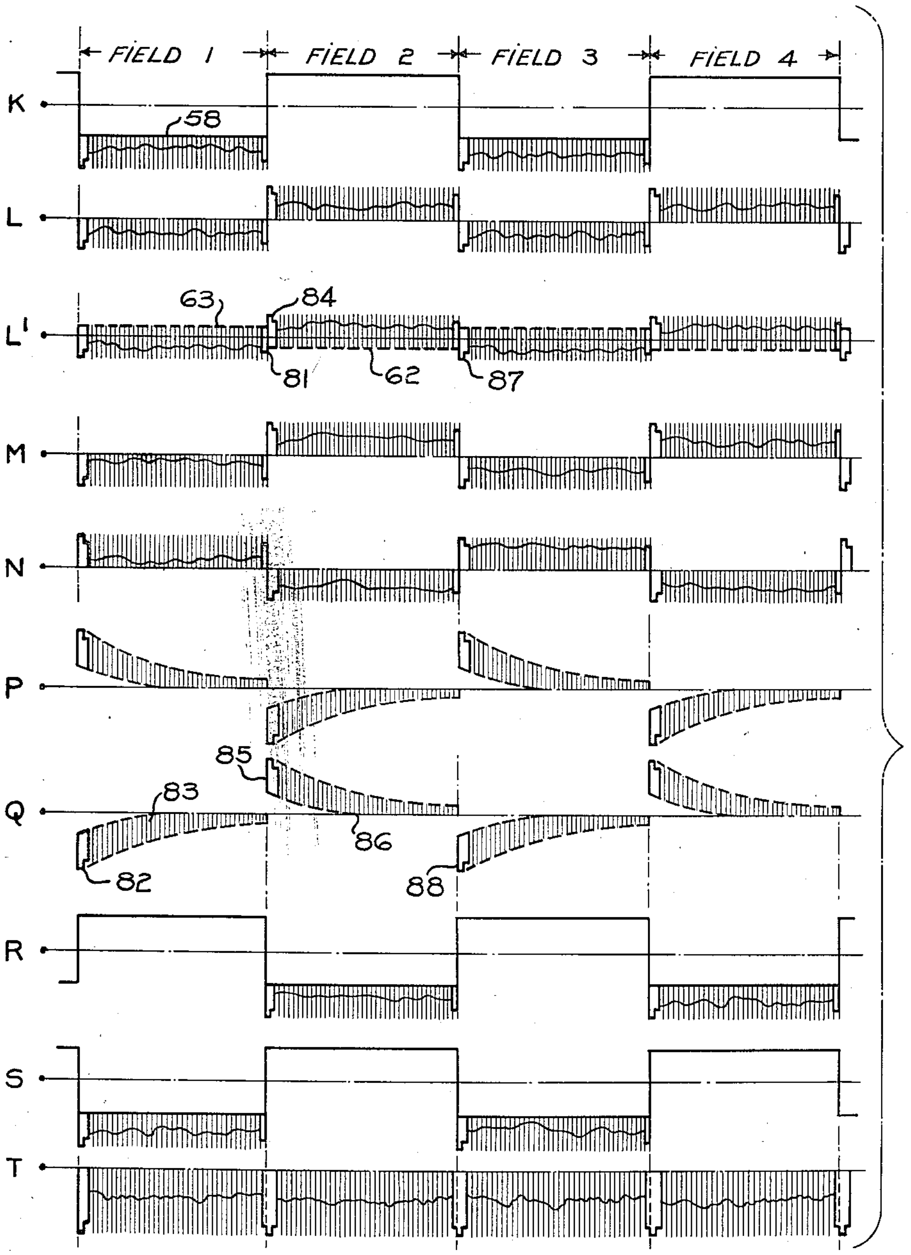
Fig. 4 is a set of graphs similar to those of Figure 3, but illustrating additional signal wave forms.

Considering first the curve K of Figure 4, it will be seen that the normal video signal represented by the curve A of Figure 3 is superimposed upon the minimum amplitude portions 58 of one of the control signals, so that the normal video signal is carried on the output line 30 every other field, as for example, every even numbered field. The other control signal, which is represented by the curve G in Figure 3, has its minimum amplitude portion 58 coincident with the odd numbered fields, and as may be seen by reference to the curve J of Figure 3, there is superimposed upon this minimum amplitude portion 58 the reversed polarity version of the composite video signal. The reversed polarity video signals are thus caused to appear on the output line 29 at times alternate to the appearances of the normal video signals on the output line 30.

The two output lines 29 and 30 are applied as inputs to a video mixer and transient suppressor 60 which is illustrated in detail in Figure 5 of the drawings and hereinafter specifically described with reference to that figure. The mixer and transient suppressor 60 operates to combine the two signals applied as inputs thereto, and also to restore the zero signal axis of the signals so as to produce on an output line 61 a signal of the character illustrated by the curve L of Figure 4. It will be seen that the even numbered fields comprise conventional composite video signals, while the odd numbered fields comprise like signals of reversed polarity. This video signal comprising an alternation between a normal negative mode of transmission and an abnormal positive mode of transmission comprises the output of the coding or scrambling unit and is connected as is indicated in Figure 1 to the modulator unit of the transmitter.

Also, from an inspection of the curve L of Figure 4, it will be seen that the maximum amplitude variation of the output signal from the greatest amplitude of the positive going signal in the even numbered fields, to the greatest amplitude of the negative going signal in the odd numbered fields, is exactly double what the amplitude variation would be in the case of a normal composite video signal such as is represented by the curve A of Figure 3. From this it will be seen that in order to avoid over-modulation in the transmitted signal, the maximum video signal level which can be applied to the modulator unit of the transmitter is only one-half the permissible amplitude of a normal signal. As a result, the useful radiated power is only one-quarter the power that would be radiated with a normal signal.

This difficulty is obviated or at least minimized by the unique construction of the gated video follower 27 which permits the zero axis of the abnormal signals to be shifted in the positive direction, while a compensating shift in the negative direction is effected as to the zero signal axis of the normal signals occurring during the even numbered fields. The character of signal resulting from such a shift of the zero signal axis is represented by the curve L' of Figure 4, wherein the zero signal axis of the odd numbered fields is represented by the dotted line 62, whereas the zero signal axis of the even numbered fields is represented by the dotted line 63. The effect of such a shift is to reduce the maximum amplitude difference between the maximum negative going signals and the maximum positive going signals, allowing a corresponding increase in the amplitude of the video signals to be made without incurring the risk of over-modulation.

It has been determined by experiment that such "compression" of the signal amplitudes can amount to as much as 100% so that the zero signal axis 62 of the negative going signals coincides with the maximum permissible amplitude of the positive going signals, and so that the zero signal axis 63 coincides with the magnitude of the maximum permissible negative going signal. However, it is believed that superior results will be obtained in the operation of the receiving apparatus if the compression is limited to about 80% of the maximum possible.

As is shown in Figure 2, which is a block diagram of the decoding or unscrambling apparatus used at the receiving station, the signal from the second detector of the video channel of the receiver is applied as indicated at 70 to a video amplifier stage 71 operating to amplify the detected composite video signal by an amount sufficient to compensate for the loss in the signal amplitude resulting from the balance of the unscrambling apparatus. The output of the video amplifier 71 is applied as indicated at 72 to a video phase splitter 73. The video phase splitter 73 is illustrated in detail in Figure 8, and the detailed construction and operation of this device is hereinafter described with reference to that figure of the drawings.

The input signal to the video phase splitter 73 is of the same character as is represented by the curve L′ of Figure 4 hereinbefore previously described. The video phase splitter operates to produce from such an input signal a pair of output signals, one of which is in phase with the input signal, and the other of which bears a phase opposition relation thereto, so as to apply as indicated at 74 and 75 to a gated video follower 76 a normal version of the input signal shown at L′ and a polarity reversed version of that signal. Curves M and N of Figure 4 illustrate respectively the character of the signals passed to the gated video follower 76 as represented at 74 and 75.

The gated video follower 76, like the gated video follower 27 previously mentioned, comprises two separate gate circuits so arranged as to connect the input 74 to an output circuit 77 during the odd numbered fields, and to connect the input 75 to an output 78 during the even numbered fields. This control of the gated video follower 76 is derived from a timing apparatus which is in turn controlled by the input signal represented by the curve L′ of Figure 4. To this end the input signal L′ is applied as indicated at 79 to a cathode coupled phase splitter amplifier 80, one of the characteristics of which is a relatively narrow band width so as to be substantially incapable of responding to the extremely high frequency components of the composite signal shown at L′.

The phase splitter portion of the circuit 80 operates to produce from the input signal L′ a pair of output signals such as are represented by the curves P and Q of Figure 4, the former being a reversed polarity version of the input signal L′, and the latter being a normal version of the input signal L′. The phase splitting apparatus 80 is illustrated and described in detail with reference to Figure 9 of the drawings. As will be explained more fully in connection with that figure, the limited band width characteristic of the circuit 80 causes a distortion of the signals produced by the circuit, such distortion constituting a typical condenser-resistor type of decay in magnitude, such as symbolized by the curves P and Q.

Considering the curve Q, for example, it will be seen that the strong negative going synchronizing pulse 81 appearing at the beginning of the first field drives the output circuit of the phase splitter 80 strongly negative, as shown at 82, and allows that circuit to recover slowly, as is seen at 83, during the application of the horizontal synchronizing and video signals, the energy of which is represented at frequencies too high to be passed readily by the circuit 80. As a result, the zero axis of the signal is shifted abnormally in the positive direction, so that upon application to the input circuit of the strong positive going synchronizing pulse 84 occurring at the beginning of the second field, the output signal is driven in the positive direction, as is shown at 85, an abnormal amount equal to the prior shift of the zero signal axis in the positive direction. During the time of the second field, the decay in the circuit represented at 86 causes the zero signal axis to be shifted abnormally in the negative direction, so that the next strong negative going synchronizing pulse 87 occurring at the beginning of the third field, produces an abnormally strong negative going pulse 88 in the output signal.

It will be observed that the characteristic quality of the signals represented by the curves P and Q is the over-riding strength of the positive and negative going pulses appearing at the beginning of each of the fields, and coinciding in time with the time of change of the received transmissions from the normal mode to the abnormal mode, and vice versa. These strong pulses exceed in magnitude any of the following signals and are used to control the operation of a gate synchronization multivibrator 89.

The gate synchronization multivibrator 89 is illustrated and described in detail with reference to Figure 9 of the drawings. The input signals represented by the curves P and Q of Figure 4 are applied to the multivibrator 89 as indicated at 90 and 91 and so control the operation of the multivibrator 89 as to produce a pair of output signals on output lines 92 and 93 which are of the character represented by the curves E and F of Figure 3. The square wave output signals E and F are applied to a gating follower 94 which is similar in its operation to the gating follower 57 previously described. The gating follower 94 differs in some particulars, as will be made clear hereinafter with reference to Figure 9 of the drawings, but comprises a pair of gate circuits which are triggered by the input signals shown at E and F, to produce on a pair of output lines 95 and 96 a pair of square wave output signals of the character represented at G and H in Figure 3. These output signals are used to control the gates in the gated video follower 76, and the circuit is so arranged that at the beginning of each of the odd numbered fields, the first gate of the follower 76 is closed so as to connect the input 74 to the output 77 so as to produce on said output 77 a composite signal of the character represented by the curve S of Figure 4. Acting alternately therewith, the second gate of the gated video follower 76 operates during the reception of the even numbered fields to apply the input signal which is represented by the curve N of Figure 4 to the output line 78 so as to produce a composite output signal such as is represented by the curve R of Figure 4.

By an inspection of the curves R and S it will be seen that the curve R includes a normal version of the transmitted signal during the even numbered fields, the curve S includes a normal version of the video signal during the odd numbered fields, but in this connection it should be noted that the normal video signal portions comprising the curve S are derived by reversing the polarity of the reversed polarity portions of the received signal.

The two output signals carried by the lines 97 and 98 are applied to a video diode mixer and transient suppressor circuit 99 wherein the two input signals represented by the curves R and S are mixed to produce on an output conductor 100 a composite signal such as is represented by the curve T of Figure 4. This output signal, it will be seen, is an entirely normal video signal corresponding in all respects to the unscrambled video signal produced at the transmitting station and as represented by the curve A of Figure 3. This signal comprises the output of the decoding device and is applied to the first video amplifier of the television receiver so as to produce upon the image reconstituting element of that receiver an entirely normal reconstruction of the image despite the coding or scrambling which was effected at the transmitting station.

Figure 7:
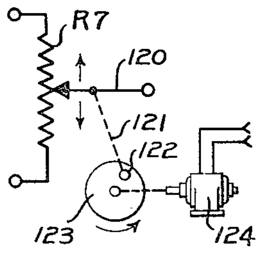
Figure 7 is a schematic representation of a means for continuously varying the times of change of transmission from one mode to another.

The foregoing description, particularly with reference to Figures 3 and 4, assumes a change-over from one mode of transmission to another coinciding with the leading edge of the vertical synchronizing pulse. As hereinbefore explained, this time of changeover may be varied either side of this position through adjustment of the timing control potentiometer R7 of the phanastron circuit. This change in time may be made at odd intervals manually so as to make more difficulty the piracy of the coded signal, or if desired, the timing can be caused to vary continuously by continuously varying the setting of the timing control potentiometer R7. Such a continuous variation may be effected by mechanical means such as are represented diagrammatically in Figure 7, wherein the movable arm portion 120 of the potentiometer R7 is connected as by means of a connecting rod 121 to a crank pin 122 provided on a rotating member 123. The rotating member 123 may in turn be rotated continuously as by means of an electric motor 124 so as to cause the potentiometer arm 120 to sweep continuously back and forth along the resistance strip of the potentiometer R7.

Figure 6:
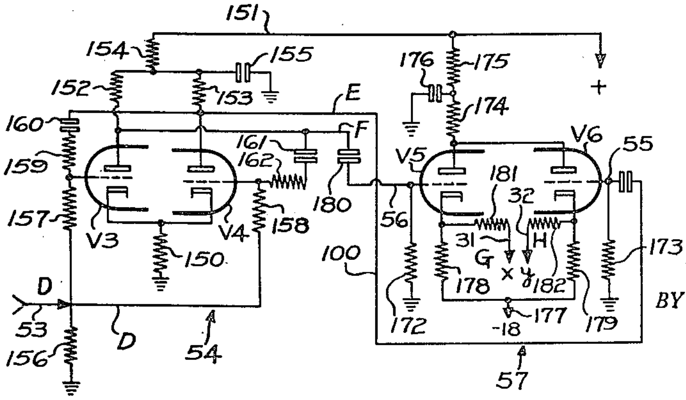
Figure 6 is a schematic wiring diagram illustrating the details of construction of a coincidence multivibrator and a gating follower shown schematically in Figure 1.

In Figure 6 is shown in detail the wiring of the various circuit components of the coincidence multivibrator and gating follower 57. The coincidence multivibrator 54 comprises a pair of triodes V3 and V4, the cathodes of which are interconnected and connected to ground through a cathode resistance 150. The anodes of both of the tubes V3 and V4 are connected to a suitable source of direct operating potential 151 through plate load resistances 152 and 153, a series resistance 154 and shunt condenser 155 being associated with the plate supply circuit 151 for the purpose of minimizing intercoupling between the coincidence multivibrator 54 and the gating follower 57. The input signal, such as is represented by the curve D of Figure 3, is applied as shown at 53 across an input resistance 156, one end of which is grounded and the other end of which is connected through coupling resistances 157 and 158 to the grids of the triodes V3 and V4, respectively. The grid of the triode V3 is coupled in the usual manner to the plate of the triode V4 by means of a coupling resistance 159 and coupling condenser 160. A similar coupling employing a coupling condenser 161 and resistor 162 is used to couple the grid of the triode V4 to the plate of the triode V3.

The multivibrator circuit just described is not free running, but is instead triggered by the input pulse signals shown by curve D of Figure 3. These signals are positive going pulses and operate to cause the non-conducting tube of the pair V3, V4 to start conduction, and the resulting negative pulse produced on the plate circuit of that tube, being applied to the grid of the opposite tube of the pair, drives the second tube to a non-conductive condition so that the signals appearing on the plates of the triodes V3 and V4 comprise square wave signals of the character represented respectively by the curves F and E of Figure 3.

The square wave output signals produced by the coincidence multivibrator 54 are applied as indicated by the conductors 55 and 56 to the grids of a pair of triodes V5 and V6. These grids are each returned to ground through grid resistances 172 and 173 and the plates of the tubes V5 and V6 are connected in parallel and to the source of plate supply potential 151 through a plate load resistance 174 and a decoupling resistance 175, the lower end of the decoupling resistance 175 being also connected to ground through a decoupling condenser 176.

The cathodes of each of the tubes V5 and V6 are connected to a source of negative bias potential represented at 177 through cathode resistances 178 and 179, respectively. The negative bias supply 177 is preferably of the order of magnitude of 18 volts negative.

The square wave inputs to the grids of the tubes V5 and V6 causes the cathode potentials of these tubes to vary in a square wave fashion as is represented by the curves G and H of Figure 3 between limits of from −18 volts to a positive value of about 10 or 15 volts. In order to understand the manner in which this result is achieved, attention is directed to the square wave signal F during the even numbered fields, at which time the signal F has a positive voltage of the order of magnitude of 100. This voltage, applied to the grid of tube V5 causes the tube to conduct to saturation and also causes the tube to draw grid current. The resulting high cathode current flowing through the cathode resistance 178 produces a voltage drop through the cathode resistance 178 sufficient to raise the cathode potential from the non-conductive level of −18 volts to a positive value of the order of magnitude of 10 or 15 volts, the actual magnitude being fixed within relatively narrow limits by the fact that the tube V5 is conducting under saturated conditions, and the voltage therefore being determined solely by the saturation current of the tube and the ohmic value of the resistance 178.

The positive signal just described is applied to the grid of the tube V5 through a coupling condenser 180 interposed between the grid of the tube V5 and the plate of the tube V3. Since the tube V5 draws grid current, the condenser 180 is accordingly charged by the voltage difference between the anode voltage of the tube V3 and the grid voltage of the tube V5, the degree of charge on the condenser 180 being in the order of 50 volts.

At the beginning of the succeeding odd numbered field, the plate voltage of the tube V3 abruptly shifts in the negative direction; as may be seen from an inspection of the curve F of Figure 3. This negative shift being of the order of magnitude of 50 volts is of course passed directly by the condenser 180 to the grid of the tube V5 and so drives the grid to a negative potential of sufficient magnitude to cut off the tube V5 completely and render the same non-conductive.

The two output signals represented by the curves G and H of Figure 3 are applied to the gated video follower 27 which is included in the wiring diagram of Figure 5, the signals being coupled to vacuum tubes V7 and V8 through coupling resistances 181 and 182, the circuit interconnecting Figures 5 and 6 of the drawings being represented by the arrows *x* and *y* and conductors 31 and 32 appearing in both figures.

Figure 5 illustrates the construction of the video phase inverter and amplifier 21, the gated video follower 27 and the video mixer and transient suppressor 60 used in the transmitting apparatus. The video phase inverter and amplifier 21 comprises vacuum tubes V1, V2 and VR. The vacuum tube V1 may be a conventional triode, the cathode of which is coupled to ground through a fixed resistance 200 and a variable cathode resistance 201 connected in series therewith. The grid of the tube V1 is returned to ground through a grid resistance 202 and is coupled through a coupling condenser 203 to the input line 204. The signal which is thus applied to the grid of tube V1 is the normal composite video signal such as is represented by the curve A of Figure 3.

The anode of the tube V1 is connected through a plate coupling resistor 205 to the cathode of the triode V2, the anode of the tube V2 is in turn connected through a plate load resistance 206 to a suitable source of plate supply potential such as is represented at 207 and is also bypassed to ground through a bypass condenser 208.

The grid of the tube V2 is returned to ground through a grid resistance 209 and is maintained at a positive potential of exactly 150 volts with respect to ground by virtue of being connected as shown at 210 to the anode of the voltage regulating tube VR. Voltage regulating tube VR has its cathode connected to ground as shown at 211 and its anode connected to the plate supply 207 through a suitable regulating resistance 212.

The function of the regulating tube VR and the triode V2 is to provide for the tube V1 a low plate load resistance supplied by a plate supply of extremely accurate regulation. The regulator tube VR operates to clamp the cathode of the tube V2 at the regulated value of 150 volts allowing the use of a plate coupling resistance 205 of extremely low ohmic value, as for example, of the order of 200 ohms. Since the internal impedance of the cathode follower tube V2 is of the order of 300 ohms, the effective plate load of the tube V1 is of the order of magnitude of 500 ohms, allowing a substantially flat frequency response down to frequencies less than 30 cycles per second.

The tube V1 operates as a phase inverter so as to produce on the plate of the tube V1 a signal, the instantaneous polarity of which is opposite to that of the input signal. This phase reversed signal is applied as indicated at 26 through a coupling condenser 221 to the grid of the triode V7, the grid of the triode V7 being returned through a grid resistance 222 to a negative bias source 223 which may be of the order of magnitude of −6 volts. In like manner, the normal input signal derived from the input conductor 204 is applied as by the conductor 28 through a coupling condenser 226 to the grid of the triode V8. This grid is connected through a grid resistance 227 to the movable arm 228 of a potentiometer 229, the ends of which are connected as indicated at 230 and 231 to negative bias sources of somewhat different voltages, as for example, −4.5 and −7.5. This allows the negative bias of the tube V8 to be shifted roughly 1½ volts either way from the −6 volts which is the bias normally applied to the grid of the tube V7. The purpose of this arrangement will be explained hereinafter.

The anodes of the tubes V7 and V8 are connected to each other and to a suitable source of direct operating potential as is represented by the conductor 232. The cathodes of the tubes V7 and V8 are connected as indicated at 31 and 32 directly to the aforementioned coupling resistances 181 and 182, which are in turn connected respectively to the cathodes of the tubes V5 and V6, so that the cathode load resistances for the tubes V7 and V8 comprise respectively the resistances 181, 178 and 182, 179.

The operation of the circuit just described may be understood by recalling that during the odd numbered fields the tube V5 was completely cut off so that its internal impedance was infinite. The tube accordingly has no effect on the cathode circuit for the tube V7 so that the output circuit for the tube V7 extends from the plate supply 232 to the anode, from anode to cathode of the tube V7, and through the resistances 181 and 178 to the negative bias potential of 18 volts supplied by the source 177. Under these conditions and with the negative bias of approximately −6 volts which is applied to the grid of tube V7, tube V7 is in an operating condition as a cathode follower amplifier with the cathode load resistance comprising the resistances 181 and 178. Thus the reverse phase signal which is applied to the grid of the tube V7 appears also on the cathode of that tube and appears as an output signal on the output conductor 29, the character of the signal being that which is illustrated by the curve J of Figure 3. During this same period of time the tube V6 is conducting to saturation so that its cathode is at a positive potential of around 10 or 15 volts. A like positive potential is therefore applied through the resistance 182 to the cathode of the tube V8. This renders the tube V8 non-conductive by reason of producing an effective negative grid bias of about −24 volts, so that any signal applied to the grid of tube V8 during this period will be entirely absent from the cathode voltage.

During the even numbered fields, the conditions are reversed, the tube V7 being cut off and the tube V8 being rendered conductive so as to produce at its cathode an in-phase version of the input signal, this signal appearing on the output conductor 30 connected to the cathode of the tube V8, the signal on the output conductor 30 being of the character represented by the curve K of Figure 4.

The conductors 29 and 30 are connected respectively to the cathodes of a pair of diode rectifiers V10 and V9. The anodes of the diodes V10 and V9 are interconnected with each other and connected to ground through a load resistance 242, the ungrounded end of the resistance 242 being connected to the output conductor 61.

Since the diodes V9 and V10 can conduct only when the cathodes thereof are negative with respect to the anodes, and since the anodes of the tubes are necessarily at the same potential as a result of being connected in parallel, it will be seen that the tube V9 will be conductive when a negative potential appears on the conductor 30 and a positive potential appears on the conductor 29, and conversely that the tube V10 will be conductive when a negative potential appears on the conductor 29 and a positive potential appears on the conductor 30. By reference to the curve J of Figure 3 and the curve K of Figure 4 it will be seen that the tube 10 will conduct during the even numbered fields and that the tube V9 will conduct during the odd numbered fields. Since the tubes conduct alternately the effect is to apply alternately to the output conductor 61 the J signal during the even numbered fields, and the K signal during the odd numbered fields, so as to produce on the conductor 61 a composite signal of the character represented by the curve L of Figure 4.

In this connection, it is important to observe that the operating potentials and the values of the resistances 178, 179, 181 and 182 must be so selected that the video and synchronizing signals appearing on the conductors 29 and 30 never rise to a positive value but are always on the negative side of ground potential. This may be obtained by operating the cathodes of the tubes V7 and V8 at a steady state value of about 3 volts negative during their conductive conditon, and by using a sufficiently low level input signal to the grids of the tubes V7 and V8 as to produce an output swing of less than 3 volts. Also it will be observed that the zero signal reference of the composite video signal portions of the outputs appearing on the conductors 29 and 30 is the steady state cathode potential just mentioned as being preferably of the order of −3 volts. This level can be adjusted by varying the grid bias of either or both of the tubes V7 and V8 as for example, by means of the potentiometer 228, 229 hereinbefore mentioned. When the base lines or zero signal levels of the output signals are shifted in the manner described, the aforementioned "compression" represented by the curve L′ of Figure 4 is obtained.

Attention is directed to the fact that at the change-over time between transmitted fields, the shifting of the cathode voltage of the follower tube V7 or V8 in the positive direction renders the corresponding diode V10 or V9 nonconductive so as to effectively prevent the transmission from either of the conductors 29 or 30 to the output conductor 61 of any switching transients which may be produced by the switching of the gating follower tubes V5 and V6.

The video amplifier 71 and video phase splitter 73 are illustrated in detail in Figure 8. The video amplifier 71 comprises a vacuum tube V17 connected as a conventional resistance coupled amplifier to the input conductor 70 and being coupled by the output conductor 72 to the phase splitter 73 which utilizes the vacuum tube V18. The cathode of the vacuum tube V18 is connected to ground through a load which comprises resistances 300 and 301, resistance 301 serving also as a bias resistance. The grid of the tube V18 is returned to the midpoint between the resistors 300 and 301 through a grid resistance 302. The anode of the tube V18 is connected through a plate load resistance 303 to a suitable source of plate supply potential through a decoupling network comprising resistance 305 and shunt condenser 306. The cathode load 300, 301 is made substantially equal to the plate load 303 so that the cathode and plate voltage swings resulting from the application of a signal to the grid of the tube V18 are of substantially the same magnitude but of opposite phase.

The anode of the tube V18 is connected through a coupling condenser 310 to the output conductor 75 and the cathode is connected through a coupling condenser 311 to the output conductor 74. These conductors are connected to the input of the gated video follower 76 which is substantially identical in construction to the gated video follower 27 employing vacuum tubes V7 and V8 described in connection with Figure 5, and differing therefrom in only one material respect, namely, in the omission of the potentiometer 228, 229 for varying the zero signal axis voltage.

The video diode mixer and transient suppressor 99 utilizing diodes V21 and V22 may be identical with the mixer and suppressor 60 described in connection with Figure 5 and utilizing the diodes V9 and V10.

Figure 9 illustrates the construction and wiring of the narrow band width phase splitter amplifier 80 utilizing vacuum tubes V11 and V12, the gate synchronization multivibrator 89 and the gating follower 94. The gate synchronization multivibrator 89 utilizes a pair of triodes V13 and V14 which may be connected in a multivibrator circuit which is identical with that utilized in the coincidence multivibrator circuit 54 described in connection with Figure 6 and employing vacuum tubes V3 and V4. In a similar manner the gating follower 94 utilizes a pair of triodes V15 and V16 in a circuit which may be identical with that described in connection with Figure 6 as comprising the gating follower 57 and utilizing the vacuum tubes V5 and V6.

The narrow band width amplifier and phase splitter 80 shown in Figure 9 and comprising the vacuum tubes V11 and V12 may be arranged to apply the input signal from the conductor 79 directly to the grid of the tube V11 as shown in Figure 9. This grid is connected to ground through series connected coupling resistances 400 and 401. The anode of the tube V11 is connected through a plate load resistance 402 to a suitable source of plate supply potential 403, which potential is also applied through a coupling resistance 404 to the point of common connection between the grid resistances 400 and 401, this common point being also connected as by means of a conductor 405 to the grid of the phase inverter tube V12 through a coupling resistance 406, which is the equivalent of the coupling resistance 400.

The cathodes of the tubes V11 and V12 are interconnected and connected to ground through a cathode resistance 407. The anode of the tube V12 is connected to the plate supply source 403 through a plate load resistance 408. The output signal which appears on conductor 90 is taken from the anode of the tube V11 and the output signal which appears on conductor 91 is taken from the anode of the tube V12. These two tubes cooperate to constitute an amplifier of limited band width incapable of handling the high frequency components of the composite signal fed thereto from the conductor 79, and serve also to produce on the conductors 90 and 91 equivalent signals differing from each other in being of opposite instantaneous polarity.

This phase splitting function is obtained by the interconnection of the cathodes of the tubes V11 and V12 and the use of a cathode resistance 407 of high ohmic value. This may be seen by assuming the grid of the tube V11 to be shifted in the positive direction. Such a shift will increase the plate current drawn by the tube V11 causing the plate voltage of the tube to shift in the negative direction so that such a negative shift appears on the output conductor 90. Increase in plate current drawn by the tube V11 shifts the cathode of the tube in the positive direction and correspondingly shifts in the positive direction the potential of the cathode of the tube V12. The grid of the tube V12 is held at a fixed value by reason of its connection through resistance 406 to the upper end of the resistance 401, so that the positive shift in cathode potential of the tube V12 is the equivalent of applying a negative shift to the grid of the tube. This reduces the plate current drawn by the tube V12 and increases the voltage at the plate of the tube. It is thus seen that the output conductor 91 is caused to shift in the positive direction when the output conductor 90 shifts in the negative direction.

The narrow band characteristic of the circuit involving the tubes V11 and V12 and its inability to handle high frequencies is obtained through the use of plate load resistances 402 and 408 of high ohmic value and by the use of a resistance of high ohmic value as the cathode resistance 407.

The inability of the tubes V11 and V12 and their associated circuits to handle the high frequency components of the composite signal produces the decay type of response which is represented by the curves P and Q of Figure 4. This is obtained by reason also of the insertion into the conductors 90 and 91 of a series condenser and resistor feed such as is represented by the reference characters 410, 411 and 412, 413. The time constant of each of these coupling circuits is made long relative to the time separation of horizontal synchronizing pulses with the result that the signal appearing on the conductors 90 and 91 decays from the high initial value produced by the initial pulse signal transmitted through the condenser to the relatively low values represented in the curves P and Q.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

We claim:

1. In a system of the character described, means for scanning a scene to produce a video quantity which varies in accordance with light intensity of elemental areas of the scene scanned to produce successive fields, means for generating vertical synchronizing pulses in integral timed relationship with operation of said scanning means and with development of said fields, means for differentiating said vertical synchronizing pulses, and means controlled with said differentiated pulses for periodically changing the polarity of alternate ones of such successive fields of the video quantity.

2. The arrangement set forth in claim 1 in which delay means are incorporated to delay the effect of the differentiated pulses on the polarity changing means.

3. The arrangement set forth in claim 2 in which means are incorporated for periodically changing the time of delay.

4. In a system of the character described, a picture converting unit, a scanning unit for controlling the converting unit to develop during recurrent trace intervals a video frequency signal representing successive fields of a scanned subject and including a synchronizing signal generator for developing during interposed intervals a synchronizing signal in integral timed relationship with development of said successive fields and representing a timing characteristic of the converting unit, means for changing the polarity of said video signal in alternate ones of said successive fields, means controlling said polarity changing means in accordance with said synchronizing signal to develop alternate positive and negative video modes, and means for altering the reference level of alternate video modes to thereby effect a compression of the composite signal.

5. In a system of the character described, a picture converting unit, a scanning unit for controlling said converting unit to develop during recurrent trace intervals a video frequency signal representing successive fields of a scanned subject, said scanning unit including a synchronizing signal generator for developing during interposed intervals a synchronizing signal in integral timed relationship with development of said successive fields and representing a timing characteristic of said converting unit, means mixing said video frequency signal and synchronizing signal to form a composite video train, means applying said composite video train, on the one hand, to a phase inverter and, on the other hand, to a gated passive network, means coupling said phase inverter to said gated network, means deriving from said composite video train an electrical quantity representative of said synchronizing signal, means coupling said electrical quantity to said gated passive network to therewith control said network to allow alternate inverted and uninverted composite video trains, each representing one of said successive fields, to pass therethrough, a mixing stage coupled to said passive network for developing a second composite video train which includes alternate positive and negative video trains spaced in timed relationship with said synchronizing signal.

6. The arrangement set forth in claim 5 in which said mixing stage includes transient suppressing means whereby the effect of the synchronizing signals in the alternate positive and negative video trains will not be obscured.

7. The arrangement set forth in claim 5 in which means are included for rendering the base line in each alternate positive and negative video train non-coincident, whereby the range in voltage level is minimized and the second composite video train may be transmitted more efficiently.

8. In a system of the character described, a picture converting unit, a scanning unit for controlling said converting unit to develop during recurrent trace intervals a video frequency signal representing successive fields of a scanned subject and including a synchronizing signal generator for developing during interposed intervals a synchronizing signal representing a timing characteristic of said converting unit and appearing in timed relationship with said successive fields, means for differentiating said synchronizing signal, means for deriving a second synchronizing signal from said differentiated signal, means for changing the polarity of said video signal, means controlling said polarity changing means in accordance with said second synchronizing signal to develop a composite video train which includes alternate ones of said successive fields in positive and negative modes respectively, transmitting means modulated by said composite video train, receiving means, said receiving means including detecting means for detecting the time of change of transmission from one mode to another, and means coupled to said detecting means for developing a composite video train, the components of which are all of the same polarity.

9. The arrangement set forth in claim 8 in which said detecting means includes means for sensing the direction of polarity change of the received composite signal so as to maintain not only proper synchronization but to also maintain proper phase.

10. The arrangement set forth in claim 8 in which said means for deriving a second synchronizing signal includes a pair of cascade connected phantastrons for delaying the effect of the second synchronizing signal on the polarity changing means.

11. In a television receiving system of the character described for producing video of unidirectional polarity from a transmitted wave modulated in accordance with alternate positive and negative video modes with each one of said modes representing a single field of a scanned subject, said receiving system including detecting means, video utilization means, a passive network coupling said utilization means to said detecting means, means controlling said passive network, said controlling means including means responsive to the instantaneous polarity of the detected video applied to said network operative to produce reversal of alternate video modes whereby a unidirectional video mode only is applied to said utilization means.

12. In a system of the character described for producing unidirectional polarity video from a transmitted wave modulated in accordance with alternate positive and negative video modes with each one of said modes representing a single field of a scanned subject, receiving means including detecting means, video utilization means, said receiving means including a first channel coupling said detecting means to said utilization means, said channel including a video phase splitter and gated video follower, a second channel coupling said detecting means for controlling said gated video follower in accordance with the polarity of said video modes, said second channel including a limited bandwidth phase splitting amplifier, a multivibrator and a gating follower coupled to said video follower to control the operation thereof whereby said utilization means is supplied with unidirectional video.

13. The arrangement set forth in claim 12 in which a clamping means is coupled to said gated video follower to establish both the maximum and minimum values of the composite video train which is allowed to pass through said gated video follower.

14. In a receiving system of the character described, means for detecting alternately appearing negative and positive mode video trains in a received wave with each one of said video trains representing a field of a scanned subject, a utilization means, means coupling said utilization means to said detecting means, said coupling means including video mode reversing means, and means operated exclusively at the location of said detecting means and responsive to change in polarity of the video mode for operating said mode reversing means.

References Cited in the file of this patent

UNITED STATES PATENTS

| | | |
|---|---|---|
| 2,386,088 | Bingly | Oct. 2, 1943 |
| 2,401,405 | Bedford | June 4, 1946 |
| 2,402,058 | Loughren | June 11, 1946 |
| 2,487,682 | Wendt | Nov. 8, 1949 |
| 2,510,046 | Ellett et al. | May 30, 1950 |
| 2,521,010 | Homrighous | Sept. 5, 1950 |
| 2,623,941 | Aram | Dec. 30, 1952 |
| 2,636,936 | Goldsmith | Apr. 28, 1953 |